and of making same, its basic form and shape when submerged in water for

United States Patent [19]
Larsen et al.

[11] 3,931,415
[45] Jan. 6, 1976

[54] RAW FISH BAIT PRODUCT AND METHOD OF MAKING SAME

[76] Inventors: Lars T. Larsen; Robert M. Morse, both of 766 Plaza Hermosa, Novato, Calif. 94947

[22] Filed: Oct. 7, 1974

[21] Appl. No.: 512,820

[52] U.S. Cl. .................... 426/1; 426/454; 426/643
[51] Int. Cl.² .................... A23L 1/325; A23K 1/10; A01K 97/04
[58] Field of Search ....... 426/1, 149, 212, 454, 473, 426/513, 643

[56] References Cited
FOREIGN PATENTS OR APPLICATIONS
251,218   4/1963   Australia.................................. 426/1

*Primary Examiner*—James R. Hoffman
*Attorney, Agent, or Firm*—Townsend and Townsend

[57] ABSTRACT

A raw fish bait product, and method of making same, consisting almost entirely of a relatively solidly compacted body of comminuted, dried out raw fish remnants having structural integrity sufficient to maintain its basic form and shape when submerged in water for substantial periods of time.

6 Claims, No Drawings

RAW FISH BAIT PRODUCT AND METHOD OF MAKING SAME

This invention relates to a new and improved natural fish bait and method of manufacturing same.

In particular, the invention in its present form and as developed and tested to date, is particularly useful as bait in traps for crustaceans such as crab and lobster.

In essence the product embodying the invention consists entirely of a mixture of raw fish carcasses including the skin, bone, entrails, and meat residue thereof preferably supplemented with remnants of raw squid, clam meat or the like, which is processed and manufactured in the form of a comminuted, substantially dry mass compressed and shaped in a geometric form, such as a cylindrical wafer. Raw fish carcasses, and remnants of squid or other skeletal or non-skeletal fish, will be collectively referred to hereinafter and in the claims as "remnants."

A principal object and advantage of the present invention is to provide a natural —i.e. entirely, or substantially entirely raw fish product — which has an exceptionally and unexpectedly long shelf life, with or without refrigeration, and which has an exceptionally and unexpectedly long useful life as an underwater bait, capable of attracting its prey even after prolonged submergence and physical and chemical action of the underwater environment.

In commercial fishing on the Pacific Coast, for instance, it is often necessary or desirable to set and leave crab traps for periods of 4 – 6 days before returning for the catch. Obviously any bait which has an effective "bait life" — i.e., the ability to attract crabs into the trap — for only a minor fraction of the time that the trap is set before recovery, is inefficient and relatively uneconomical as compared to a product with a "bait life" that can extend over the full duration of the trap set before recovery of the catch.

In this connection it is conventional practice amongst commercial crab fishermen to bait their traps with the fresh carcasses of raw fish, particularly rock fish, such as ling cod, black cod, and red snapper. In conventional practice the raw fish carcasses are hung inside the trap so that odors from the carcass can pass from inside the trap to the surrounding waters to thereby attract crabs into the trap where the bait is suspended. Often the hanging carcass is supplemented with squid or clams suspended in a perforated jar called a Bait Jar. Although raw fish carcass is an exceedingly effective crab bait for relatively short periods of time, such bait has a maximum useful life of 2 days before spoiling to such an extent that it is no longer an effective bait. As noted above, it is often necessary, usually because of weather conditions, for commercial fishermen to have to leave their traps up to 4 – 6 days before returning for the catch, and it is apparent that it is inefficient and relatively unproductive to utilize bait (such as raw fish carcass) that has an effective bait life for only a fraction of the time that the trap is set.

Tests in respect to the present invention, as conducted to date, evidence that it has an effective bait life in salt water of up to six days and thereby is many times more effective and productive than conventional fresh raw fish carcass bait as above described.

Further, when raw fish carcasses and the supplemental bait have been allowed to completely spoil inside the trap and/or perforated bait jars, it is a time consuming, relatively costly, and most unpleasant task to thoroughly clean the rotted material from them and to make the same usable for the next use. In using the present invention, the spoilage of the bait not only is a lot less likely to occur, but remaining bait within the container can be quickly and readily shaken out and the container rinsed without mess or time consuming difficulty.

Another object and advantage of the invention is to utilize what is largely waste product from commercial fishing — i.e. the fish carcasses and other fish remnants which are usually, although not always, thrown away as waste.

The best mode developed to date for making a product embodying the present invention in limited quantity is set forth hereinbelow by the following examples and descriptions.

PROCESS OF MANUFACTURE

A mixture of 9 pounds of fresh raw fish (rock fish) carcasses plus 1 pound of raw squid remnants was ground into relatively small particles using a conventional domestic garbage disposal unit as a grinder without adding additional water during the grinding process. These ground particles were then placed on a black polyethylene plastic sheet and warm air dried with the assistance of an air fan at temperatures in the range of approximately 80°F to 120°F, until such particles were crumbly and substantially dry to the touch. This air dried material was then weighed and had a net weight of approximately 3 pounds, indicating a water loss of about 7 pounds during the drying step. Thereupon the mass of relatively dry particles was further ground and comminuted by placing them into a conventional type kitchen blender. The resulting intermediate product was observed to have the texture and touch of a relatively coarse meal such as coarse ground corn meal, for example.

This mixture was then placed in a 3-inch diameter 5-ton hydraulic ram press which was operated to compress and compact the loose mealy type mixture to about one-third its original volume and to form a relatively densely compacted 3 inch cylinder of said material. The compression step also appears to cause the release and more or less uniform distribution of oils throughout the mass. The final weight of the cylinder so formed was 2¾ pounds, indicating that during compressing and compacting step some further moisture and some oils were extruded.

Subsequently, approximately ½ inch slices were cut from the cylinder to form individual wafers approximately 3 inches in diameter and one-half inch thick.

Utilizing these wafers the following experiments and tests have been performed:

EFFECTIVENESS OF BAIT

In one test fresh, live and active crabs were placed in a tank downstream from a constant flow of sea water being introduced into one end of the tank. Adjacent the inlet end a raw fish wafer embodying the invention was placed in the moving stream and the crabs upon sensing the bait upstream moved toward the bait and upon reaching same commenced to devour the same. Similar results were observed on numerous subsequent similar tests.

In other repeated tests, wafers embodying the invention were placed in bait jars inside crab traps in San Francisco Bay at commercial fishing locations and healthy catches of crabs were made.

EFFECTIVE BAIT LIFE

In another test a wafer embodying the present invention was placed in a jar of sea water and maintained at approximately 50°F for a period of six days. During the first day frequent observations were made which indicated that within a period of several hours the outer layers of the raw fish particles comprising the wafer swelled to a point where the thickness of the wafer increased approximately one-quarter inch. However, the wafer otherwise maintained its structural integrity under water and remained firm to the touch of a knife blade. Thirty six hours after initial submersion the wafer swelled about another one-quarter inch in thickness but again maintained its structural integrity. From that time on no substantial changes were observed to occur in terms of swelling or change of color until the end of the sixth day where the product had substantially softened in water although no substantial spoilage seemed to have occurred. This same wafer after being submerged 6 days was placed in the live crab tank under conditions described above, and demonstrated it still had effective bait attracting qualities to the crabs. This same test was also made with the wafers submerged for a total of 6 days in a bait jar within a crab pot at about 6 fathoms with crabs still being attracted inside the traps on the sixth day thereby demonstrating the long effective bait life of the product.

SHELF LIFE

Without any preservatives added, wafers made according to the above described process, wrapped loosely in sheet plastic, and maintained at room temperature have lasted upwards of 90 days without apparent spoilage and without losing their quality as an attractive bait to crabs according to tests conducted in the crab tank as hereinabove set forth.

DENSITY

The density of the wafer product made according to the hereinabove described process was measured and determined to be 17.3 grams per cubic inch.

In actual use as bait in a commercial crab trap, raw fish wafers embodying the invention are preferably wrapped in a fairly fine fabric or wire mesh to give them additional structural integrity which may then in turn be placed in a conventional perforated bait container suspended inside the crab trap. The odor and flavor of the wafers when submerged under water are permitted to flow outwardly to attract crabs inside the trap. More specifically, due in large measure to the action of water currents, the surface particles of the wafer gradually flake off and migrate outside the bait jar and outside the trap. However, the perforated container prevents the crabs from actually devouring the bait.

Although raw fish bait of the present type has been especially developed in reference to serving as bait for crab traps, the use to which such bait product may be put is not considered as limiting the scope of the invention. For example, it is contemplated that chunks or relatively small pieces of the present bait product could be used for baiting hooks or as bait for attracting fish other than crabs.

Although according to the testing and evaluation to date raw fish wafers made according to the invention possess qualities of substantially long shelf life at room temperature without preservatives being added, it is considered within the scope of the present invention that certain selected food preservatives in predetermined quantities could be added to prolong not only the shelf life of the product but to also extend the usable life of the bait under water.

Further, although we consider it preferable to supplement the raw fish carcasses with remnants of squids, clams or the like to give the wafer a seemingly greater and faster bait attractability quality, we have conducted tests of the type described hereinabove under the headings "Effectiveness of Bait" and "Effective Bait Life" with raw fish wafers made in the manner above described, but solely out of raw fish carcasses and without the addition of any squid remnants or the like. The wafers so made and tested very effectively attracted crabs both in the tank and underwater trap tests, and no differences in terms of effective bait life have been observed to date between wafers supplemented by squid remnants and those made entirely of raw fish carcasses.

Although the present invention has been described in some detail by way of illustration and example, it is understood that the scope of the invention is limited by the claims appended hereto.

What is claimed is:

1. A fish bait product consisting almost entirely of relatively solidly compacted body of comminuted, substantially dried out raw fish remnants having structural integrity sufficient to maintain its basic form and shape when submerged in water.

2. A product according to claim 1 and wherein said raw fish remnants consist almost entirely of raw fish carcasses.

3. A product according to claim 1 and wherein said remnants include a mixture of raw fish carcasses and a relatively minor amount of remnants from non-skeletal raw fish such as squid.

4. A product according to claim 1 which is substantially free of any substantive amounts of preservatives or additives.

5. The product of claim 1 and wherein the density of the wafer is in the range of 15 – 20 grams per cubic inch.

6. A method of making a raw fish bait product comprising the steps of comminuting the remnants of fresh raw fish; drying the comminuted mass to a point where said mass is substantially dry to the touch and has a substantially coarse mealy texture and consistency; then compressing and compacting said comminuted dry raw fish particles into a discrete body of geometric form and shape having structural integrity sufficient to maintain its basic form and shape when submerged in water.

* * * * *